Figure 1:
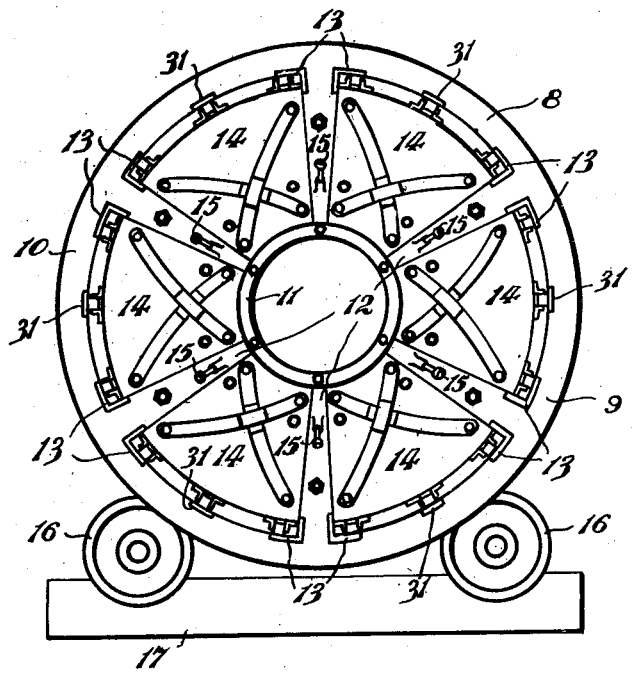

Dec. 27, 1949 G. H. RAFFERTY 2,492,535
CENTRIFUGAL MOLDING APPARATUS FOR THE
MANUFACTURE OF ROOFING TILES
Filed June 14, 1947 3 Sheets-Sheet 1

INVENTOR
George Henry Rafferty
BY: John M Graham
HIS AGENT.

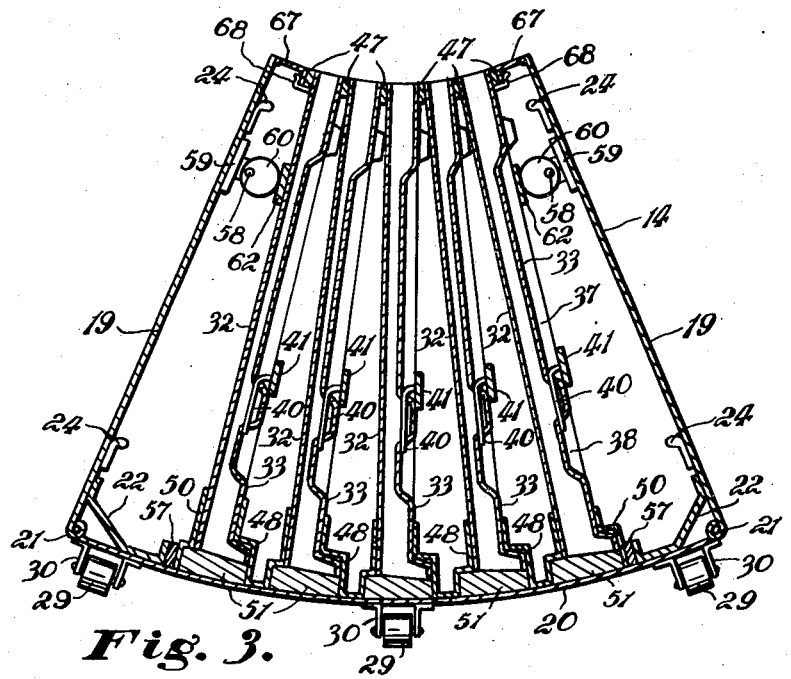

Dec. 27, 1949  
G. H. RAFFERTY  
2,492,535  
CENTRIFUGAL MOLDING APPARATUS FOR THE  
MANUFACTURE OF ROOFING TILES  
Filed June 14, 1947  
3 Sheets-Sheet 3
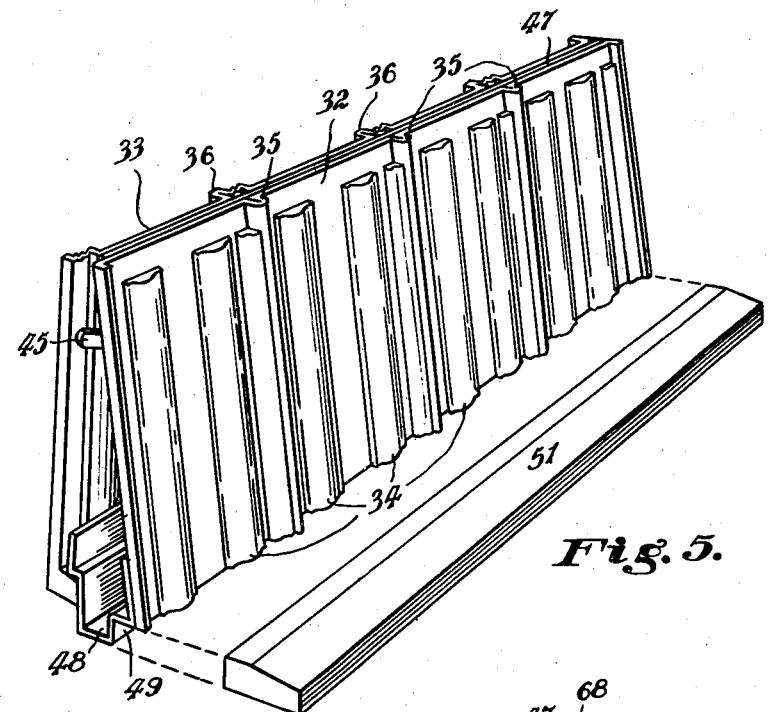
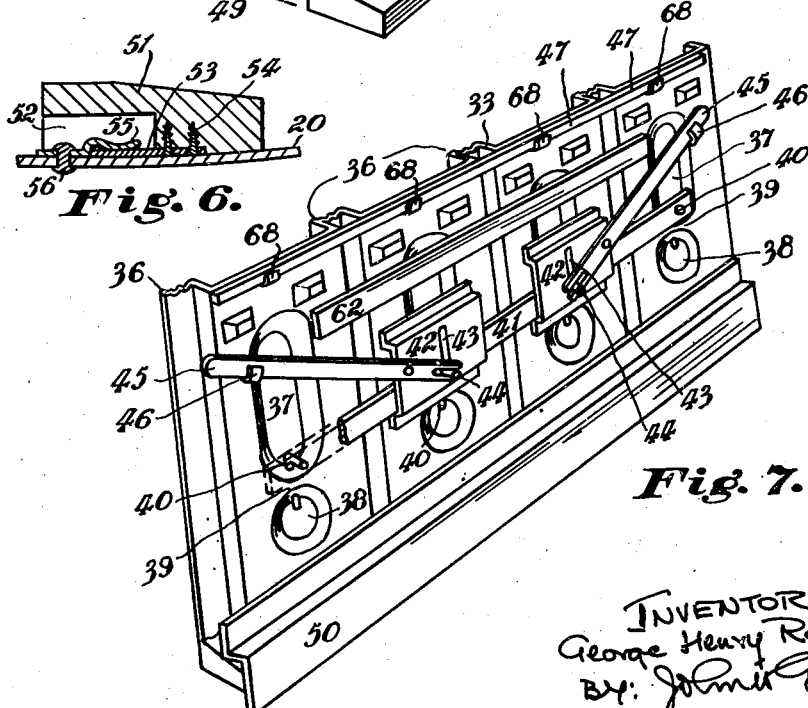
INVENTOR  
George Henry Rafferty  
BY: John M Graham  
HIS AGENT.

Patented Dec. 27, 1949

2,492,535

UNITED STATES PATENT OFFICE 2,492,535

CENTRIFUGAL MOLDING APPARATUS FOR THE MANUFACTURE OF ROOFING TILES

George Henry Rafferty, Forrest, Victoria, Australia

Application June 14, 1947, Serial No. 754,640 In Australia June 26, 1946

3 Claims. (Cl. 25—43)

This invention relates to improvements in centrifugal apparatus for the manufacture of roofing tiles or the like, and it has more particular reference to mould formers and carriers therefor of improved construction and design.

It has been proposed to provide apparatus of the centrifugal type by the use of which tiles, in particular, may be manufactured quickly and economically. Such apparatus comprised a cylindrical frame rotatable about a substantially horizontal axis. The said frame consisted of two circular end members, each of which comprised a circular rim, an inner concentric ring, and radial arms in spaced relationship interconnecting the inner ring with the outer rim. Longitudinal frame bars on either side of the outer ends of the radial arms connected the two end members together, and T-section bearer arms extended between the inner ends of corresponding radial arms of the two end members. In the segmental spaces bounded by the outer rim, the inner ring and successive radial arms, mould carriers were adapted to be removably fitted, bearing on the said longitudinal frame members. The T-section bearer arms were provided with means whereby they could be tightened down on the inner edge portions of the mould carriers to hold them firmly in place. The apparatus was mounted on friction rollers on parallel shafts and was driven at required speed by suitable means, and meantime a cementitious mix was introduced into the axial space bounded by the inner rings of the end members and fed centrifugally into the mould carriers. A number of pairs of mould plates were arranged radially within each mould carrier and when centrifugal moulding was completed, the mould carriers were adapted to be removed and partially dismantled to enable moulded tiles to be removed therefrom.

The apparatus of the character described was not found to be satisfactory in use, for although the principle was sound, the moulds and mould carriers were not of a satisfactory nature to produce roofing tiles. The mould carriers were unduly difficult to position in, or remove from the machine. Furthermore, whilst the machine was in operation there was a tendency for the mould plates to move within the carrier, resulting in unevenness in the tiles produced. A still greater disadvantage resided in the fact that no provision was made for the production in the tiles of holes for the purpose of tie-wires, whereby roofing tiles are ordinarily attached to the roof frame of a structure.

My present invention has been devised with the principal object of overcoming the said present disadvantages by providing mould carriers and mould formers or mould plates which are of improved character and by the use of which roofing tiles of good quality may be manufactured quickly, simply and economically.

Figure 2:
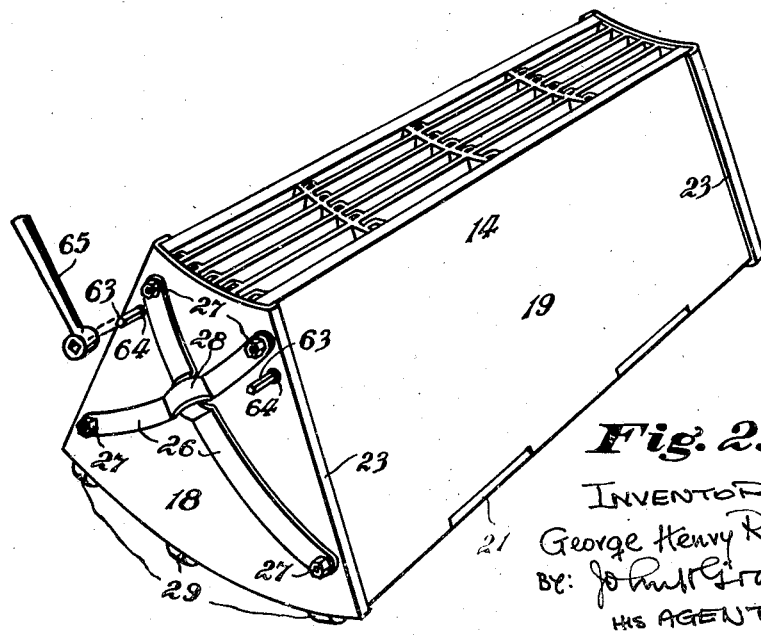

In order that my invention may be more readily understood, reference is now made to the accompanying drawings, wherein:

Fig. 1 is a front elevational view of a machine for centrifugally moulding tiles from cementitious material and provided with mould carriers according to my invention, Fig. 2 is a perspective view of an assembled mould carrier removed from the machine illustrated in Fig. 1, Fig. 3 is a cross-sectional view of the mould carrier shown in Fig. 2, Fig. 4 is a perspective view of a dismantled mould carrier, Fig. 5 is a perspective view of a mould former and a spacing block according to my invention, Fig. 6 is a cross sectional view of the spacing block shown in Fig. 5, and Fig. 7 shows in perspective a mould plate according to my invention.

In these drawings, the centrifugally moulding machine shown in Fig. 1 is of known type and comprises broadly a rotatable frame 8 including two similar end members 9, each having an outer rim 10 and an inner ring 11. The outer rim and inner ring are rigidly interconnected by radial spokes 12. Angle irons 13 secured at their ends near to the outer ends of the said spoke members 12 connect the two end members 9 in rigid arrangement. Mould carriers 14 are adapted to fit in the segmental spaces between the outer rim, the inner ring and successive spokes 12. Clamping bolts 15 are adapted, when rotated, to cause a clamping action on the said mould carriers holding such carriers firmly in place. The rotatable frame is mounted on rollers 16 rotatably mounted on a suitable base 17, and rotary motion imparted to the said rollers by any suitable means causes the frame 8 to revolve at sufficiently high speed.

Each of the mould carriers 14 consists broadly of two removable end plates 18, two side plates 19 and a base plate 20, each of the said side plates being hingedly connected to a longitudinal edge of the said base plate.

The base plate and the side plates are constructed preferably of sheet metal of suitable gauge, the side plates being shaped at their lower edges and the base plate being shaped at its longitudinal edges to form, in association with suitable pins, hinges 21. Check-plates 22 are welded or otherwise secured along their upper edges to the inner surfaces of the side plates 19. The said check-plates extend obliquely inwards and downwards and when the mould carrier is assembled, they bear against the base plate 20. The inner edge portions of the check plates 22 are upturned for a purpose which will be hereinafter explained. The base plate is curved laterally to arcuate form.

The end plates 18 are formed of sheet metal of appropriate gauge and are of substantially segmental shape. The side and bottom edge portions of the said plates are inturned to form strengthening flanges 23. The end plates are adapted to close the ends of the mould carriers, the flanges 23 lapping over and imparting rigidity to the end portions of the side plates 19 and the base plate 20. Bolts 24 welded or otherwise secured within the end portions of the side plates 19 are adapted to pass through appropriately positioned apertures 25 formed in the end plates. Curved bracing bars 26 which are apertured at their ends are adapted to be engaged by the bolts 24, and nuts 27 engaging with the said bolts act to hold the bracing bars to the end plates and the end plates to the side plates of the mould carrier. The said bracing bars 26 are positioned in diagonal arrangement and have outwardly curved portions 28 at or about their crossing midportions whereby haulage tackle may be secured to the mould carrier to facilitate its removal from the centrifugal moulding machine.

On the underside of the base plate 20 are arranged three longitudinal rows of rollers 29 rotatably mounted in brackets 30 welded or otherwise secured to the said base plate. The outer rollers are adapted to bear on the longitudinal angle irons 13 of the frame 8 of the machine, and the rollers of the medial row are adapted to bear on an intermediate rail 31, one of which is positioned centrally between each pair of angle irons 13, being connected at its ends as by welding to the rims 10 of the frame 8 of the machine.

A number of tile moulding elements are removably fitted within the assembled mould carrier. These elements include upper mould plates 32 and lower mould plates 33. Each of the upper mould plates 32 is constructed suitably of sheet metal pressed to such shape that it is adapted to mould the upper faces of a row of four tiles (see particularly Fig. 5), and to that end is formed with a number of convexities 34 adapted to form conventional channels in the upper tile faces, and division pieces 35 to divide one moulded tile from the next. Each of the lower mould plates 33 (see particularly Fig. 7) is likewise formed of sheet metal and is adapted to mould the lower faces of a row of four tiles, and to that end is shaped to form recessed portions and convexities to mould projections and hollows in the moulded underside of the tile as well as division pieces 36 to divide the moulded tiles. The said shaped convexities when viewed from the rear of the lower mould plate (see Fig. 7) are concavities in the pressed metal, and in each tile portion of the mould plate consists of a relatively large upper concavity 37 and a circular lower concavity 38 immediately therebelow. The said concavities are separated by a raised bridge portion 39 which, in the moulded tile, is required to have a wirehole formed therethrough. In order to effect the forming of the said holes in the tiles being moulded, there is provided for each tile section of the lower mould plate a pin 40 which is adapted to pass slidably through two apertures formed in the mould plate, one of the apertures leading from the bottom of the upper concavity 37 and the other aperture leading into the top of the lower concavity 38. Each of the said pins is bent over at a right angle at its upper end portion, and the bent over end is rigidly secured in an appropriately apertured cross bar 41. The said cross bar is retained slidably in two brackets 42. Each of the said brackets consists of a substantially rectangular piece of sheet metal shaped to form a relatively shallow channel, of which the longitudinal edges are out-turned and welded or otherwise secured to the rear face of the lower mould plate 33. A lateral slot 43 is formed in each of the said brackets, and studs 44 extending from the cross bar 41 engage slidably in the said slots to guide and limit the lateral slidable movement of the said cross bar. In order to effect this movement, a lever 45 is fulcrummed on each of the said brackets. At its lower end, each of the said levers is bifurcated to engage operatively the studs 44 of the cross bar 41. Clips 46 are welded or otherwise secured to the rear face of the mould plate in such position that they are adapted to hold releasably the upper ends of the said levers in raised position.

Within each mould carrier there are fitted five pairs of mould plates; and of these, four pairs are interconnected to constitute mould former units. Each of the said units (see particularly Fig. 5) comprises an upper mould plate 32 and a lower mould plate 33 arranged back to back. The upper edges of both mould plates are secured as by welding to a metal spacing strip 47, and their lower edge portions are welded or otherwise secured to the side portions of a spacing channel 48. The said channel is of greater width than the spacing strip 47, so that the assembled unit is substantially triangular in cross section. The said channel extends downwardly below the lower edges of the mould plates, and the lower part of the side of the channel connected to the upper mould plate is bent inwardly to form a longitudinal recess 49 immediately below the said lower edge of the upper mould plate.

Both the remaining upper mould plate 32 and lower mould plate 33 (see Fig. 7) have a spacing strip 47 welded or otherwise secured along the upper edge of their rear faces and secured along their lower edges each has a metal angle-piece 50, shaped where necessary to conform to the shape of the lower edge of the plate, which extends below the mould plate the same distance as the spacing channels of the mould former.

In order to hold the separate mould plates and the mould former units in desired spaced relation within the mould carrier, there are provided for each carrier five spacer blocks 51 (see particularly Figs. 3, 5 and 6). Each of the said blocks may be suitably made of wood, or of wood sheathed with thin sheet metal, or of any other desired construction. Along one side, the said block is of such depth that it fits within the recess 49 of the spacing channel 48, and the remainder of the upper surface of the block is inclined downwardly to form the bottom portion of a tile mould. At intervals along the spacing block 51 there are formed recesses 52 cut in from the bottom and one edge of the said block. A recessed metal plate 53 is secured as by countersunk screws 54 to the bottom of the spacer block 51 in such manner as to lie flush with the bottom surface of the block and partly close the bottom of each recess. Spring metal tongues 55 are secured as by rivets 56 to the base plate 20 of the mould former in five longitudinal rows, the positions of the said tongues in each row corresponding to the positions of the recesses 52 formed in the under-portion of each spacer block 51.

In assembling the mould plates and formers in the mould carrier, the levers 45 are first raised and engaged in clips 46 so that pins 40 are in all cases passing through the raised bridge portions 39 in the lower mould plates 33. One of the side plates 19 is raised until the check plate 22 bears at its lower portion against the base plate 20. Against the up-turned inner and lower end of the said check plate there is positioned a longitudinal bearer 57 which may suitably consist of a length of timber of substantially rectangular cross-section. A separate upper mould plate 32 is then placed in the mould carrier, the angle-piece 50 secured to its bottom edge bearing against the said bearer 57. A spacer block is clipped to the base plate 20 by means of the tongues 55 engaging the recessed metal plates 53, as shown in Fig. 6, and a mould former unit is then positioned in the mould carrier, then another spacer block, and so on, until the four mould former units and five spacer blocks have been set in place. Finally the separate lower mould plate 33 is set in place and a bearer 57 is positioned along the outer lower edge of its angle piece 50. The other side plate 19 is then raised, the check plate 22 bearing against the last positioned bearer 57, and the end plates 18 are fitted. In fitting the said end plates, the flange portions 23 lap over the base plate 20 and side plates 19, and the bolts 24 secured to the side plates pass through the apertures 25 formed in the said end plate. The bracing bars 26 are fitted on the bolts 24 in crossed diagonal arrangement, and nuts 27 are screwed tightly on the said bolts to hold the bracing bars to the end plates and the end plates in position on the mould carrier.

Successive upper and lower mould plates are held in desired spaced relationship by the division pieces 35 and 36, and in order that the mould plates and formers may be held securely together in correct disposition within the mould carrier, means are provided whereby the upper end portions of the said plates and formers are compressed tightly together. Such means may suitably consist of an arrangement of cams, as shown particularly in Figs. 3 and 4. A longitudinal cam shaft 58 is journaled in bearing brackets 59 welded, bolted or otherwise secured to the inner face of each of the side plates 19. Each of the said cam shafts has two cams 60 non-rotatably secured thereon, and near to the ends of the said shaft there is mounted a ratchet wheel 61, the purpose of which will be hereinafter explained. The said cams 60 are adapted to bear against bearing strips 62, one of which is secured longitudinally to the outer face of each of the separate mould plates 32 and 33. The said bearing strips may suitably consist of metal bar welded in place. The ends 63 of the cam shaft 57 are adapted to pass through apertures 64 formed appropriately in the end plates 18, and are squared so that they may be engaged and rotated by means of a suitable tool 65 (see Fig. 2). Pawls 66, adapted to interact with the said ratchet wheels 60 are mounted on the inner face of each of the end plates 18, and when the said cam-shaft 58 is rotated in order to cause the cams 60 to bear firmly on the bearing strips 62 to hold the mould plates and mould formers firmly together, the pawls 66 act to restrain the cam-shaft from counter rotation. If desired, release means positioned externally of the assembled mould carrier may be provided so that the said pawls may be freed from the said ratchets when desired.

In order that cementitious material will be prevented from entering the mould carrier through the openings between the side plates thereof and the outer separate mould plates 32 and 33, means are provided to effect closure of these openings. Such means consist of closure plates 67 hingedly mounted to the upper edges of the side plates 19 and downturned along their inner edges. The said down-turned inner edge portions are adapted to abut against the spacer portions 47 secured along the upper edge portions of the separate upper and lower mould plates 32 and 33. Spring clips 68 associated with the said spacer strips are adapted to hold releasably the said downturned edges of the said closure plates 67.

In use, six mould carriers arranged and assembled as hereinbefore described are positioned in the centrifugal machine, each fitting in a segmental space between inner ring 11, rim 10 and spokes 12. Fitment of the said mould carriers is facilitated by the rollers 29 bearing on the angle irons 13 and the intermediate rails 31. When the mould carriers are so positioned, they are secured in place in known manner by tightening the clamping bolts 15. A suitable source of power connected to the rollers 16 is then caused to rotate the frame 8 at a high speed, and a cementitious mix is fed into the axial opening of the machine either by hand or by the use of a suitable mechanical device. The mix feeds into the spaces between pairs of mould plates, and centrifugal force ensures that the mix is well and evenly packed in such spaces.

After the machine has been operated for a predetermined time, it is stopped. The clamping bolts 15 are loosened, and the mould carriers are removed from the frame 8 by means of haulage tackle secured to the bracing bars 26. As the mould carriers are removed, a new set of assembled mould carriers is installed to allow continuity of production.

Each of the removed mould carriers is opened by first raising cover plates 66 and releasing pawls 65 from ratchets 60, to release compression on the mould plates and formers. The nuts 27 are then unscrewed and the bracing bars 26 and the end plates 18 are removed. The levers 45 are disengaged from their clips 46 and depressed so as to cause the pins 40 to rise from the raised bridge portions 39 formed in each lower mould plate 33. One of the side plates 19 of the mould carrier is then lowered to expose the separate lower mould plate 33. The said mould plate 33 is carefully removed, after removing the bearer 57. The exposed spacer block 51 is then disengaged from the clips 55 on the base plate 20, and removed. The first mould former unit, carrying a moulded set of tiles is then taken away for storage, and a second row of moulded tiles is exposed. These tiles are likewise carried away on the mould former after first removing the spacer block 51, and so on. As soon as may be, the moulded tiles are removed and stacked in a suitable place, and the mould carrier may be assembled again.

It will be found that by the use of my invention, a considerable number of tiles may be moulded in a short time, and these tiles will be densely packed and superior to cement tiles hitherto manufactured.

What I do claim is:

1. Centrifugal apparatus for the manufacture of roofing tiles of the type wherein a number of segmental mould carriers are removably fitted in a substantially cylindrical frame adapted to be rotated about a substantially horizontal axis, characterized in that each mould carrier comprises a base plate; two side plates connected to the said base plate; two end plates adapted to be connected to the side plates; a number of radially disposed pairs of mould plates removably positioned in the mould carrier, each pair consisting of an upper mould plate adapted to mould the upper surfaces of a row of tiles, and a lower mould plate adapted to mould the corresponding lower surfaces of the row of tiles; a clamp adapted to releasably compress the mould plates within the carrier into close interfitment; a cross-bar associated with each lower mould plate; a number of pins secured to the said cross-bar; each of the said pins being adapted to pass slidably through two apertures formed on either side of a convex portion of the underside of the said lower mould plate to form a core adapted to mould a tie-wire hole in the underside of the tile, and to be withdrawn from the moulded tiles to permit the said lower mould plate to be removed from the moulded tiles; the said cross-bar being adapted to be moved in such manner as to cause the said pins secured thereto alternatively to be simultaneously passed slidably through and disengaged from the convex portions of the said lower mould plate.

2. Centrifugal apparatus for the manufacture of roofing tiles according to claim 1 wherein a hand-lever mechanism associated with the crossbar is adapted to actuate the said cross bar to engage or disengage the tie-wire hole forming pins simultaneously.

3. Centrifugal apparatus for the manufacture of roofing tiles of the type wherein a number of segmental mould carriers are removably fitted in a substantially cylindrical frame adapted to be rotated about a substantially horizontal axis characterised in that each mould carrier comprises a base plate; two side plates hingedly connected to the base plate; two removable end plates adapted to be connected to the side plates; a number of radially disposed pairs of mould plates removably positioned in the mould carrier; each pair of mould plates consisting of an upper mould plate adapted to mould the upper surfaces of a row of tiles, and a lower mould plate adapted to mould the corresponding lower surfaces of a row of tiles, successive mould plates with the exception of the outermost mould plates being co-joined in spaced relationship along their upper and lower edges to form units; a clamp adapted to releasably compress the mould plates within the carrier into close interfitment; a cross-bar mounted on the underside of each of the lower mould plates; a number of pins secured to each cross bar, each pin being adapted to pass slidably through apertures formed on either side of a convex portion of the underside of the lower mould plate to form a core adapted to mould a tie-wire hole in the underside of a tile; and at least one hand lever connected to each cross bar and adapted to move the cross bar to simultaneously engage the pins in or withdraw them from the convex portions of the lower mould plate.

GEORGE HENRY RAFFERTY.

REFERENCES CITED

The following references are of record in the file of this patent:

UNITED STATES PATENTS

| Number | Name | Date |
|---|---|---|
| 1,114,168 | Melde | Oct. 20, 1914 |
| 1,275,121 | Bender | Aug. 6, 1918 |
| 1,564,712 | Rafferty et al. | Dec. 8, 1925 |
| 1,846,290 | Walter | Feb. 23, 1932 |
| 2,350,298 | Watson | May 30, 1944 |